Jan. 14, 1969   L. E. LARSON   3,421,657
PRODUCE VENDOR WITH MULTIPLE CONVEYOR
AND HOLDBACK MEANS
Filed Nov. 10, 1966

Lloyd E. Larson
INVENTOR.

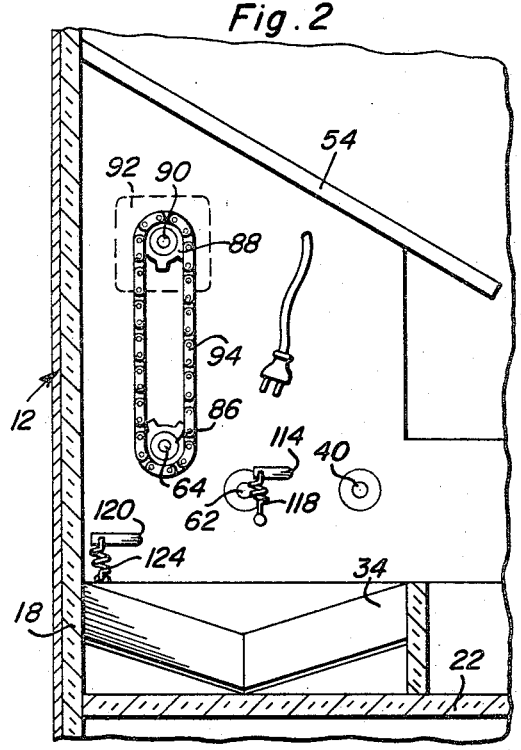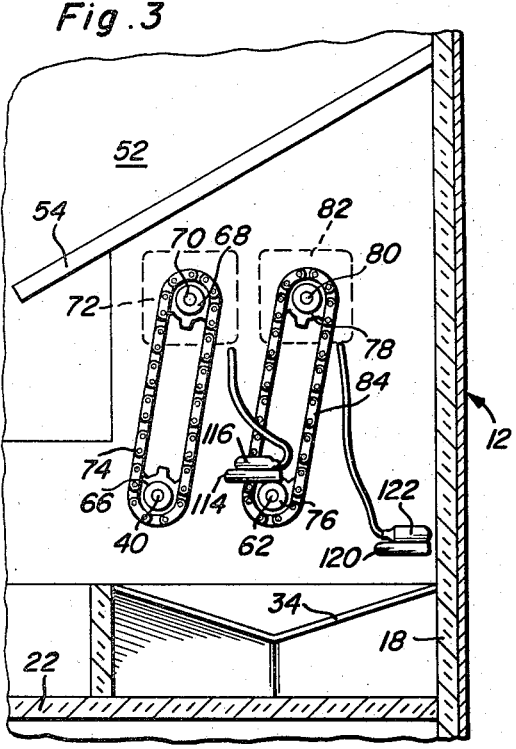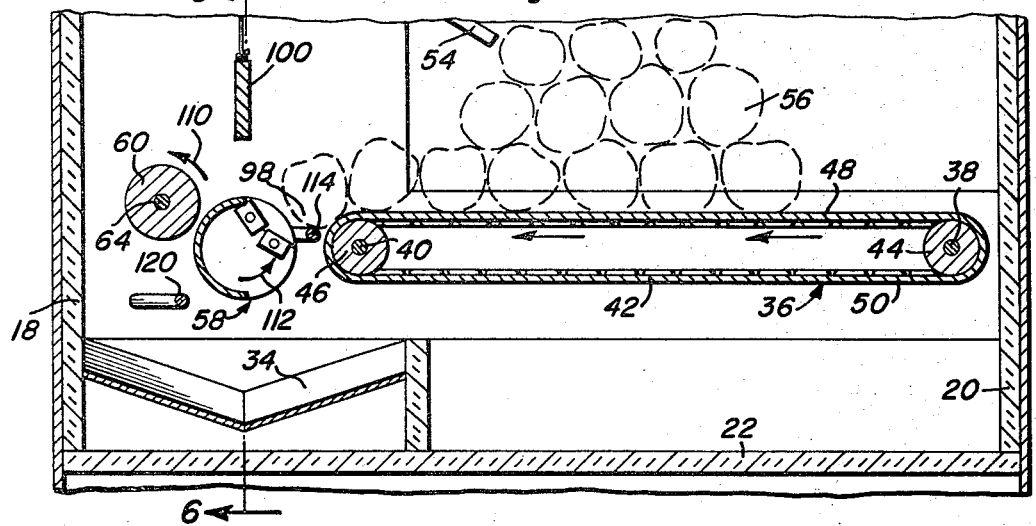

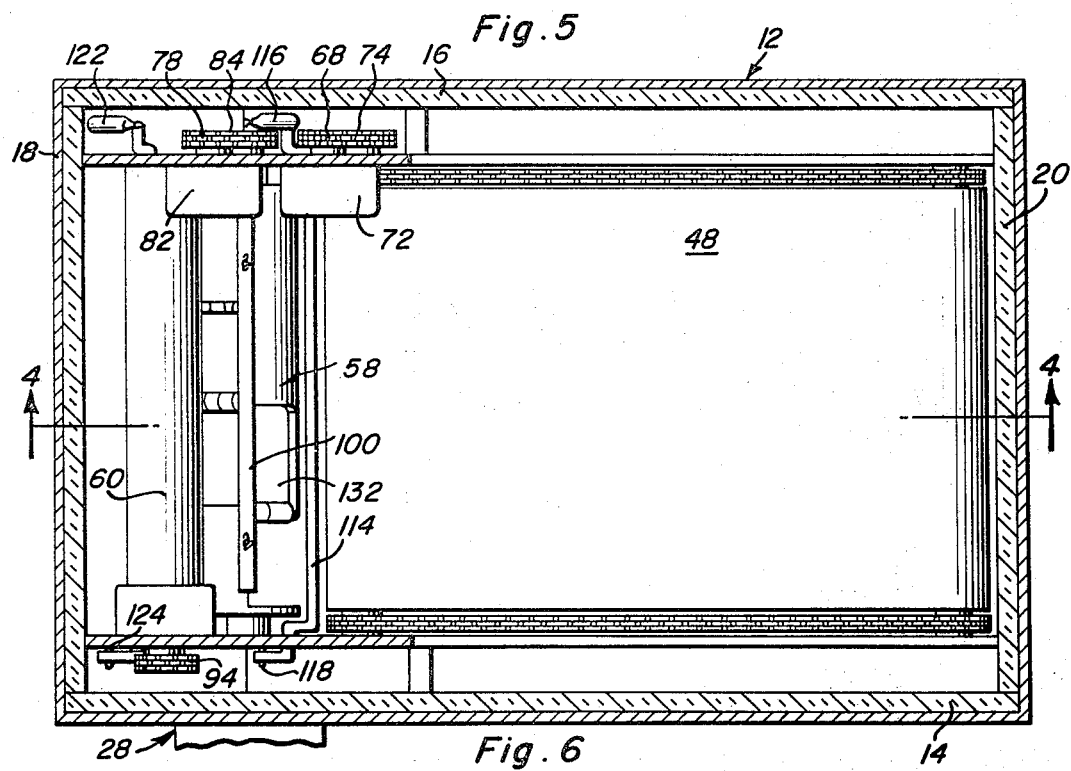
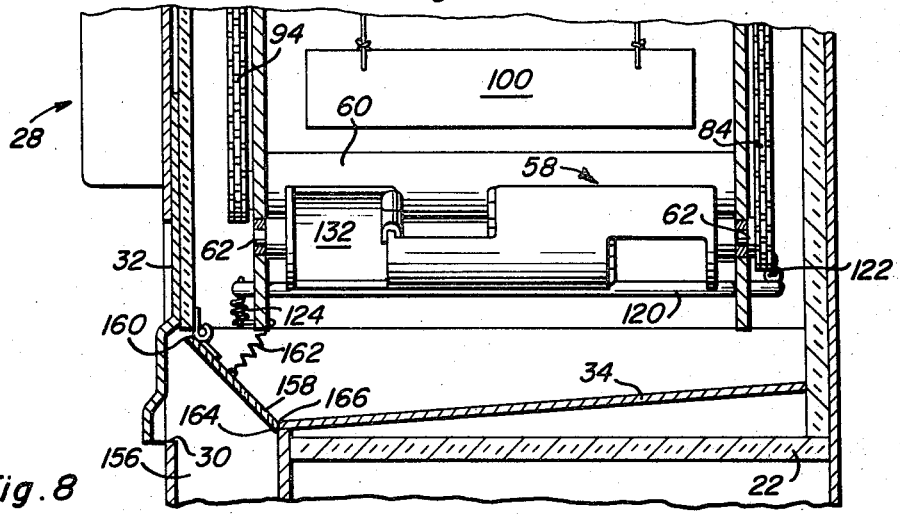
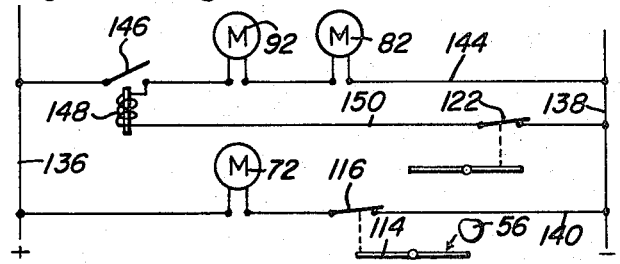
Lloyd E. Larson
INVENTOR.

United States Patent Office 3,421,657
Patented Jan. 14, 1969

3,421,657
PRODUCE VENDOR WITH MULTIPLE CONVEYOR AND HOLDBACK MEANS
Lloyd E. Larson, 5714 88th St. NE.,
Marysville, Wash. 98270
Filed Nov. 10, 1966, Ser. No. 593,361
U.S. Cl. 221—13  10 Claims
Int. Cl. G07f 11/00

ABSTRACT OF THE DISCLOSURE

A vendor including a storage bin adapted to receive and store, in random manner, quantities of articles to be dispensed from the vendor, generally horizontally disposed and movable elongated conveyor belt means defining the bottom for the bin and upon which the lowermost articles within the bin are adapted to rest, drive means connected with the belt means for selectively driving the belt means in one direction extending therealong toward a discharge end of the conveyor belt means, partition means extending transversely across the path of movement of the belt means and beneath which articles on the belt means must pass when moving from the bin toward the discharge end of the conveyor belt means and a horizontally disposed elongated and rotary discharge member extending transversely of the discharge end of the conveyor belt means and coacting with the latter to form an upwardly opening trough for receiving metered quantities of articles from the discharge end of the belt means, the rotary discharge member being adapted to singly receive articles from the trough and to singly dispense articles therefrom upon rotation of the discharge member.

---

This invention relates to a novel and useful produce vendor and more specifically to a vendor adapted to store large quantities of articles, produce or other types of articles, and to individually vend the articles upon actuation of the vendor by the insertion of a coin or coins into the coin mechanism of the vendor.

The vendor of the instant invention includes a large bin-type reservoir into which the articles to be vended may be placed in random manner such as in a pile. Although there are many types of vending machines which are capable of individually vending articles disposed therein upon the actuation of a coin-actuated control mechanism, most of these vending machines are constructed in a manner whereby the articles to be vended must be placed into and stored within the machine in preselected positions of storage. The vending machine of the instant invention, on the other hand, has been constructed in a manner whereby the articles to be vended may be placed within the storage bin portion thereof in a pile, at least a portion of the bottom of the bin defining an intermittently actuatable conveyor capable of conveying small quantities of the articles to be vended toward a discharge location capable of receiving several articles to be vended at a time.

The vending machine of the instant invention includes dispensing means operative to receive, from the discharge location, articles to be ultimately vended from the machine and the dispensing means is further operative to individually dispense the articles through an outlet chute.

The vending machine includes means responsive to the absence of articles at the discharge location above referred to to actuate the conveyor means for conveying articles to the discharge location and which is also operative to terminate operation of the conveyor means immediately upon the delivery of at least one article to the discharge location by the conveyor means. Further, the vending machine includes control means for the dispensing means actuatable by the proper coin or coins being inserted into the coin control of the vending machine and to maintain the dispensing means in operation until such time as an article controlled thereby is dispensed outwardly of the discharge chute. At this point, the discharging of a single article from the dispensing means to the discharge chute is operative to immediately terminate operation of the dispensing means.

The main object of this invention is to provide a vendor which will be capable of vending single articles from a bin of random placed articles.

Another object of this invention is to provide a vending machine in accordance with the preceding object that will readily lend itself to being refrigerated whereby perishable foodstuffs may be vended by the vending machine.

Still another object of this invention is to provide a vending machine which will be adapted, without modification, to vend various types of articles which are generally of the same size and shape of article as the articles for which the vending machine was specifically designed to vend.

A final object of this invention to be specifically enumerated herein is to provide a vending machine which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a fragmentary enlarged vertical sectional view of the vending machine taken substantially upon a plane passing through the machine immediately to the rear of the front panel thereof;

FIGURE 3 is a fragmentary enlarged vertical sectional view of the vending machine taken substantially upon a plane passing immediately forward of the rear wall of the machine and as seen looking toward the front of the machine from the rear thereof;

FIGURE 4 is a fragmentary vertical sectional view taken substantially upon the plane indicated by the section line 4—4 of FIGURE 5;

FIGURE 5 is a horizontal sectional view of the vending machine taken substantially upon a plane spaced slightly above the vending mechanism of the machine;

FIGURE 6 is a fragmentary vertical sectional view taken substantially upon the plane indicated by the section line 6—6 of FIGURE 4;

FIGURE 8 is a diagrammatical view of the wiring circuit of the vending machine.

Figure 1:
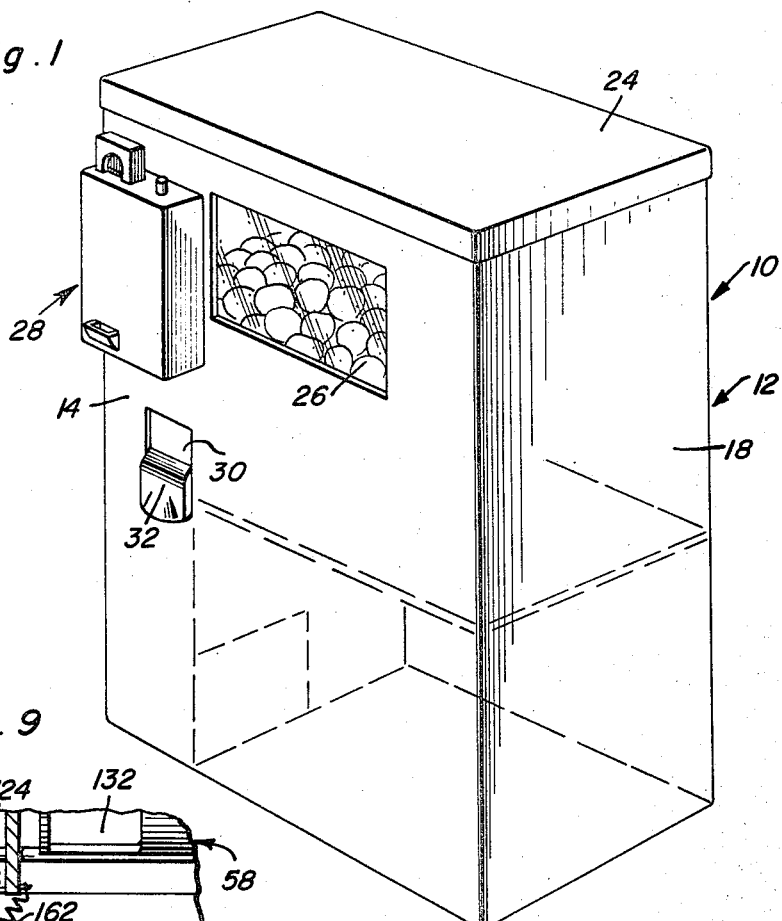
FIGURE 1 is a perspective view of the vending machine.

Referring now more specifically to the drawings the numeral 10 generally designates the vending machine of the instant invention. The machine 10 includes a housing generally referred to by the reference numeral 12 and it may be seen from FIGURE 5 of the drawings that the housing 12 includes insulated front and rear walls 14 and 16 interconnected by insulated end walls 18 and 20. Further, the machine 10 includes an insulated horizontal partition 22 spaced above the lower end of the housing 12 and a removable and insulated top wall 24 is provided for closing the upper end of the housing 12.

The front wall 14 of the housing 12 has a window 26 therein in horizontal registry with the interior of the housing 12 spaced above the partition 22 and suitable refrigeration means (not shown) is disposed within the housing 12 below the partition 22 and is operative to circulate cool air through the upper portion of the housing 12 above the partition 22, suitable air ducting means being provided for admitting cool air into the upper portion of the housing 12 above the partition 22 and allowing the return of air from the upper portion of the housing 12 into the lower portion thereof below the partition 22 for cooling by the refrigeration means.

The front wall 14 of the housing 12 supports any suitable coin control and changing mechanism generally referred to by the reference numeral 28 and is operative to close a normally open actuating switch to be hereinafter more fully set forth upon the insertion of the proper coin or coins into the mechanism 28. In addition, the mechanism 28 may also be operative to provide change for larger denomination coins.

The front wall 14 of the housing 12 includes an outlet opening 30 with which a vertically slidable door 32 is operatively associated for preventing the discharge of articles from the vendor 10 until such time as the vertically slidable door 32 is raised from its lowermost position illustrated in FIGURE 1 of the drawings. The outlet opening 30 has the lower end of an inclined discharge chute 34 in registry therewith, the latter being supported within the housing 12 above the partition 22.

Also mounted within the housing 12 is an endless conveyor assembly generally referred to by the reference numeral 36 and including an idler shaft 38, a drive shaft 40, and an endless belt 42 entrained about rollers 44 and 46 mounted on the shafts 38 and 40. The endless belt 42 includes upper and lower reaches 48 and 50 and the upper reach 48 defines at least a portion of the bottom of a bin 52 defined in the upper portion of the housing 12. The endless belt 42, upon rotation of the drive shaft 40 by means of a motor to be hereinafter more fully set forth, moves in the direction of the arrows in FIGURE 4 and the housing 12 includes a throttling baffle wall 54 which is supported within the bin 52 in an inclined position. The positioning of the baffle wall 54 is such that the lower end thereof will limit the number of articles 56 within the bin 52 which may be moved toward the discharge end of the reach 48 upon actuation of the conveyor assembly 36.

Also mounted within the housing 12 is a dispensing or delivery cylinder generally referred to by the reference numeral 58 and an article overflow "kick-back" roller 60. The dispensing cylinder 58 includes a pair of stub axles 62 which are suitably journaled from the housing 12 and the roller 60 is mounted on a shaft 64 for rotation therewith, the shaft 64 also being suitably journaled in the housing 12.

From FIGURE 4 of the drawings it may be seen that the dispensing cylinder 58 is spaced closely adjacent the roller 46 defining the discharge end of the conveyor assembly 46 and that the roller 60 is disposed closely adjacent the dispensing cylinder 58 on the side thereof remote from the roller 46 and at an elevation slightly higher than the dispensing cylinder 58.

The drive shaft 40 has a driven gear 66 mounted thereon which is driven from a drive gear 68 carried by the output shaft 70 of an electric motor 72 by means of an endless flexible chain 74. One of the stub axles 62 of the dispensing cylinder 58 has a driven gear 76 mounted thereon and the gear 76 is driven from a drive gear 78 mounted on the output shaft 80 of an electric motor 82 by means of an endless chain 84. Further, the shaft 64 has a driven gear 86 mounted on one end thereof which is driven from a drive gear 88 mounted on the output shaft 90 of an electric motor 92 by means of an endless flexible chain 94.

A discharge location 98 is defined at the discharge end of the reach 48 between the roller 46 and the dispensing cylinder 58 and a hanging partition 100 hangs over and slightly above the dispensing cylinder 58. Further, the roller 60 is disposed on the side of the dispensing cylinder 58 remote from the roller 46 and is driven in the direction of the arrow 110 at a higher speed than the speed of rotation of the delivery cylinder 58 in the direction indicated by the arrow 112.

A trip arm 114 defines the lower end of the discharge location and is pivotally supported for swinging movement through an upstanding arc from the housing 12 and carries a tilt switch 116, FIGURE 3, on one free end thereof and is yieldingly urged toward an uppermost rest position by means of an expansion spring 118, FIGURE 2, secured between the other free end thereof and the housing. Further, a similar trip arm 120 is disposed slightly beneath the dispensing cylinder 58 on the side thereof remote from the trip arm 114 and has a tilt switch 122 mounted on one free end thereof and has an expansion spring 124 secured between the other free end thereof and the housing 12. Of course, the spring 124 retains the trip arm 120 in its uppermost position and an article 56 being dispensed from the side of the dispensing cylinder 58 remote from the trip arm 114 will at least momentarily downwardly urge the trip arm 120.

The chute or ramp 34 is disposed below and extends along beneath the dispensing cylinder 58 and inclines downwardly toward the opening 30 closed by the vertically slidable door 32 and therefore articles 56 being dropped from the dispensing cylinder 58 will fall onto the trip arm 120 and then onto the chute or ramp 34 and roll downwardly along the latter toward the opening 30.

The dispensing cylinder 58 includes opposite end walls 126 from which the stub axles or shafts 62 are supported and has formed therein a plurality of longitudinally spaced openings 128 spaced equally circumferentially about the cylinder 58 with adjacent openings 128 being separated by partition walls 130 thereby defining a plurality of generally radially outwardly opening pockets 132 in the cylinder 58 which are successively registrable with the discharge location 98.

With attention now invited more specifically to FIGURE 8 of the drawings there may be seen a pair of main conductors 136 and 138 across which a first branch conductor 140 is connected having the normally closed switch 116 disposed therein. The motor 72 is serially connected in the branch conductor 140 and the trip arm 114 supports the switch 116 and is therefore operatively connected thereto to tilt the switch 116 to the open position whenever an article 56 is resting upon the trip arm 114.

A second branch conductor 144 is also connected across the conductors 136 and 138 and has motors 82 and 92 serially connected therein as well as a switch 147 acuatable by the coin control mechanism 28 and including a holding solenoid 148 connected to the branch conductor 144 and the conductor 138 by means of a further branch conductor 150 having switch 122 disposed therein, the latter being normally closed.

It will therefore be evident that the motor 72 will be operative to actuate the conveyor assembly 36 whenever there is no article 56 resting upon the trip arm 114 so as to discharge at least one article 56 to the discharge location 98 before the trip arm 114 is depressed and the switch 116 is opened. Then upon the insertion of the correct coins into the coin control mechanism 28, the switch 146 will be automatically closed so as to actuate the motors 82 and 92. In addition, closing of the switch 146 will also actuate the holding solenoid 148 inasmuch as the switch 122 is normally closed. Then, as the article or articles 56 disposed in the discharge location 98 have a pocket or pockets 132, padded as at 133, registered therewith, the articles 56 will drop into the pockets 132. Upon continued rotation of the cylinder 58, one of the articles 56 will be dropped out of the cylinder 58 and onto the trip arm 120 thereby momentarily opening the switch 122 so as to deactivate the holding solenoid 148 and allow the switch 146 to open. Thereafter, the article 56 which has been dropped onto the trip arm 120 will fall onto the ramp 34 and roll downward along the latter to the discharge or outlet opening 30. Of course, the switches 146, 122 and 116 will all return to the positions thereof illustrated in FIGURE 8 of the drawings by the time an article 56 is vended and therefore the machine 10 is again ready to be actuated upon the insertion of the proper coins into the coin control mechanism 28, the motor 82 being actuated independently of any coins being placed in the coin control mechanism.

The "kick-back" roller 60 by being rotated at a higher speed than the cylinder 58 and in the direction of the arrow 110 whenever the motor 82 is actuated, insures that any article 56 having a tendency to roll over the top of the cylinder 58 will be "kicked back" toward the discharge location 98 for reception in one of the pockets 132. Further, if an article 56, partially in the delivery cylinder 58, jams between the cylinder 58 and the roller 60, the cylinder 58 will be stalled, but the roller 60 will continue to turn thus rolling the jammed article 56 out of the cylinder 58 so as to thereby free the latter for turning by the motor 82.

Figure 9:
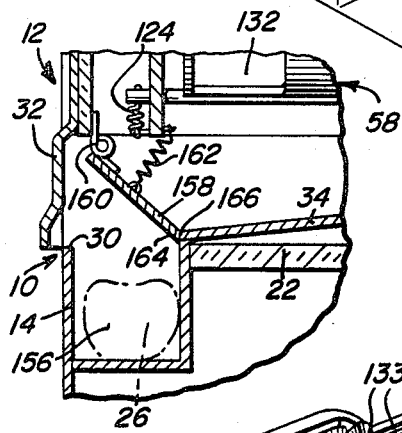
FIGURE 9 is a fragmentary sectional view similar to FIGURE 6 illustrating further details of the produce dispensing components.
Figure 7:
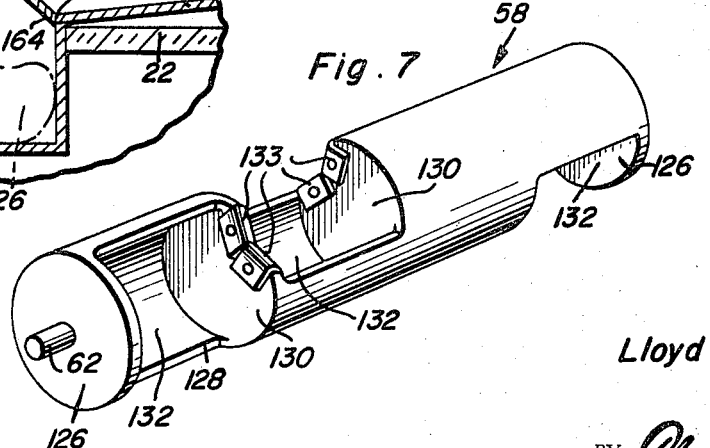
FIGURE 7 is a perspective view of the rotary dispensing cylinder of the dispensing machine.

As can best be seen from FIGURE 9 of the drawings, the lower end of the discharge chute 34 opens into the upper end of a closed bottom vertically extending well 156 closed on its front side by the front wall 14 having the opening 30 disposed therein. The opening 30 is in horizontal registry with the upper end of the well 156 and a baffle plate 158 is pivotally supported from the front wall 14 by means of a hinge assembly 160 secured to the front wall 14 above the opening 30. An expansion spring 162 is provided and operatively connected to the baffle plate 158 for yieldably urging the latter toward the position thereof illustrated in FIGURE 9 of the drawings with the lower marginal edge portion 164 of the baffle plate 158 abutting the end edge 166 of the lower end of the chute or ramp 34.

The expansion spring 162 yieldably urges the baffle plate 158 to the position thereof illustrated in FIGURE 9 of the drawings with a force that is readily overcome by an apple 26 rolling down the chute 34. Accordingly, an apple 26 moving down the chute or ramp 34 will cause the lower end portion of the baffle plate 158 to swing downwardly thereby permitting the apple 26 to drop into the bottom of the well 156. Of course, after the apple 126 has dropped into the lower portion of the well below the path of movement of the lower edge portion of the baffle plate 158, the latter will be free to pivot rearwardly toward its rest position illustrated in FIGURE 9 of the drawings. After the apple 126 has been deposited in the bottom of the well 156, a person using the vendor 10 may readily lift the vertically slidable door 32 to gain access to the apple 26. However, the baffle plate 158 positively prevents unauthorized use of the vendor 10 by persons wishing to insert their arms up into the area disposed above the chute or ramp 34.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vendor defining storage bin means adapted to receive and store articles in loose bulk form and a discharge location, elongated horizontal conveyor means defining the bottom for at least a portion of said storage bin means and upon which the lowermost articles within said bin means rest, said conveyor means being operative to move the lower articles in said bin means toward one end of said conveyor means at which said discharge location is disposed, article receiving means adjacent said discharge location operative to receive and support at least one article at a time from said discharge location and also defining dispensing means operative to singly dispense articles therefrom, said article receiving and discharge means including drive means, said discharge drive means including control means intermittently actuatable to actuate said discharge drive means for dispensing articles from said discharge drive means and operative in response to a single article being dispensed from said discharge means to terminate operation of said discharge drive means.

2. The combination of claim 1, wherein said discharge drive means includes coin control means operative in response to the insertion of the proper denomination of coin in said coin control means to actuate said discharge drive means.

3. A vendor defining storage bin means adapted to receive and store articles in loose bulk form and a discharge location, elongated horizontal conveyor means defining the bottom for at least a portion of said storage bin means and upon which the lowermost articles within said bin means rest, said conveyor means being operative to move the lower articles in said bin means toward one end of said conveyor means at which said discharge location is disposed, article receiving means adjacent said discharge location operative to receive and support at least one article at a time from said discharge location and also defining dispensing means operative to singly dispense articles therefrom, said conveyor means including drive means, said conveyor drive means including control means operative in response to the absence of articles at said discharge location to actuate said drive means for conveying articles toward said discharge location and operative in response to the conveying of an article to said discharge location to terminate operation of said conveyor drive means.

4. The combination of claim 3, wherein said article receiving and discharge means includes an elongated horizontal member journaled for rotation about an axis generally paralleling the longitudinal center line of said elongated member, said discharge location being disposed slightly to one side of and above said center line and being in the form of an upwardly opening trough defined between said horizontal member and said one end of said conveyor means, said horizontal member including at least one generally radially opening pocket successively registrable with said trough for receiving an article therein from said trough by gravity movement of said articles thereinto upon angular displacement of said pocket into registry with said trough.

5. The combination of claim 4, wherein said conveyor drive control means includes a control switch actuating bar disposed in and extending along the lower portion of said trough and responsive to the weight of one of said articles resting thereon to effect termination of operation of said conveyor drive means.

6. The combination of claim 4, wherein said control means for the drive means of said article receiving and discharge means includes a control switch actuating bar disposed on the side of said horizontal member remote from said trough and positioned to be struck by an article falling downwardly out of said pocket and responsive to the weight of said article thereon to effect termination of operation of said drive means for said article receiving and discharge means.

7. A vendor comprising storage bin means adapted to receive and store quantities of articles to be dispensed from said vendor, conveyor means associated with said storage bin means operative to convey small quantities of said articles to a discharge location, article receiving means operative to receive and retain at least one article at a time from said discharge location and also defining dispensing means operative to singly dispense articles therefrom, said conveyor means including drive means, said conveyor drive means including control means operative in response to the absence of articles at said discharge location to actuate said drive means for conveying articles toward said discharge location and operative in response to the conveying of an article to said discharge location to terminate operation of said conveyor drive means, said article receiving and discharge means including an elongated horizontal member journaled for rotation about an axis generally paralleling the longitudinal center line of said elongated member, said discharge location being disposed slightly to one side of and above said center line, said horizontal member including at least one generally radially opening pocket for receiving an article therein from said discharge location by gravity movement of said articles thereinto upon angular displacement of said pocket into registry with said discharge location, said control means for the drive means of said article receiving and discharge means including a control switch actuating bar disposed on the side of said horizontal member remote from said discharge location and positioned to be struck by an article falling downwardly out of said pocket and responsive to the weight of said article thereon to effect termination of operation of said drive means for said article receiving and discharge means, a journaled kick-back roller disposed alongside said horizontal member on the side thereof remote from said discharge location and including drive means operable in response to operation of the drive means for said elongated member to drive said roller at a greater peripheral speed than the peripheral speed of rotation of said elongated member and in the same direction of rotation whereby any article rolling overtop of said elongated member in the direction of rotation of the latter will contact said roller and be spun by engagement therewith back over the top of said elongated member in a direction opposite to the direction of rotation of said elongated member.

8. In combination with an elongated horizontal member mounted for rotation about its longitudinal axis and extending transversely of the discharge end of an elongated conveyor, said horizontal member including at least one generally radially opening article receiving pocket, said member and said discharge end of said conveyor coacting to define an upwardly opening trough-shaped zone extending along said member between the latter and said discharge end and adapted to receive articles from said conveyor to be handled by said member and with which said article receiving pocket is successively registered upon rotation of said member, an article discharge zone being defined on and extending along the other side of said horizontal member adjacent a lower portion thereof, drive means drivingly connected to said horizontal member and including control means actuatable to initiate operation of said drive means, article discharge sensing means disposed in said article discharge zone and operatively connected to said control means to terminate operation of said drive means in response to an article dropping from said horizontal member through said discharge zone, said conveyor means including drive means operable independently of the drive means for said horizontal member and including article sensing means disposed in said trough-shaped zone operative to actuate said conveyor means drive means in response to an absence of an article in said trough-shaped zone and to terminate operation of said drive means in response to the presence of an article in said trough-shaped zone.

9. The combination of claim 3 wherein said dispensing means include an inclined discharge chute adapted to have said articles singly dispensed downwardly therealong, said vendor including means defining an upstanding closed bottom well in registry with the lower end of said chute and with the latter opening into the upper portion of said well at one side thereof, said means defining an access opening through which access may be gained to the interior of said well for manual removal of an article from the bottom of said well, said access opening into the upper portion of said well from the opposite side thereof in generally horizontal registry with the lower end of said chute, and upstanding baffle plate means pivotally secured to said means along its upper edge portion for oscillation about a horizontal axis adjacent the upper extremity of said access opening at said other side of said well, said baffle plate projecting down into said well below the level of said lower end of said chute and being swingable toward a rest position at least closely adjacent said one side of said well adjacent the lower end of said chute, and means yieldingly urging said baffle plate toward said rest position with a force adapted to be overcome by an article disposed downwardly along said chute toward said well, whereby said article may angularly displace the lower end of said baffle plate toward said other side of said well into a position providing for unrestricted movement of said article into the upper end of said well and subsequent movement to the bottom of said well, said well being of a depth shallow enough for a person to reach a hand through said access opening and down into the bottom of said well but of a depth sufficient to enable the lower end of said baffle plate to pass over an article disposed in the bottom of said well.

10. The combination of claim 3 wherein said baffle wall means comprises an inclined partial bottom wall for said bin means, said partial bottom wall being inclined downwardly away from said one end of said conveyor means.

References Cited

UNITED STATES PATENTS

| | | | |
|---|---|---|---|
| 2,462,276 | 2/1949 | Mueller | 221—253 X |
| 3,237,749 | 3/1966 | Dudas | 221—253 X |
| 905,401 | 12/1908 | Billmeyer | 221—13 |
| 1,050,268 | 1/1913 | Forth. | |
| 1,729,886 | 10/1929 | Massie | 221—115 |
| 2,680,051 | 6/1954 | James | 221—13 |
| 2,719,651 | 10/1955 | Gabrielsen | 221—115 X |

STANLEY H. TOLLBERG, *Primary Examiner.*

U.S. Cl. X.R.

221—115, 251